US006227872B1

(12) United States Patent
Stephenson et al.

(10) Patent No.: US 6,227,872 B1
(45) Date of Patent: May 8, 2001

(54) MOISTURE RESISTANT ELECTRICAL CONNECTOR FOR A CELLULAR TELEPHONE

(75) Inventors: Shawn M. Stephenson, Raleigh, NC (US); William H. Jennings, Bedford, VA (US); Mark William Weadon, Apex, NC (US); Stacy Smith, Apex, NC (US); Brad Kreschollek, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/128,949

(22) Filed: Aug. 5, 1998

(51) Int. Cl.[7] .................. H05K 1/00; H01R 3/00
(52) U.S. Cl. .......................... 439/76.1; 439/500
(58) Field of Search ................ 439/76.1, 55, 892, 439/500, 736, 676, 638; 379/450, 454, 455; 429/97, 98, 9; 361/600; 455/90, 575, 59, 433, 480

(56) References Cited

U.S. PATENT DOCUMENTS

| | | | |
|---|---|---|---|
| 4,310,923 | * | 1/1982 | Kennedy ............................ 455/79 |
| 5,158,468 | * | 10/1992 | Curtis et al. ...................... 439/76 |
| 5,281,150 | * | 1/1994 | Bungda et al. ................... 439/67 |
| 5,338,230 | * | 8/1994 | Bryce et al. ..................... 439/629 |
| 5,517,683 | * | 5/1996 | Collett et al. .................... 455/89 |
| 5,655,018 | | 8/1997 | Estevez-Alcolado de Holl et al. . |
| 5,663,699 | * | 9/1997 | Shoriyama ........................ 335/126 |
| 5,685,742 | * | 11/1997 | Reynolds .......................... 439/676 |
| 5,733,674 | * | 3/1998 | Law et al. .......................... 429/9 |
| 5,738,954 | * | 4/1998 | Latella et al. ..................... 429/97 |
| 5,786,106 | * | 7/1998 | Armani ............................. 429/98 |
| 5,883,787 | * | 3/1999 | Reier ............................... 361/752 |
| 5,896,453 | * | 4/1999 | Speaks ............................. 379/433 |
| 6,025,996 | * | 2/2000 | Vacheron et al. .................. 361/774 |

FOREIGN PATENT DOCUMENTS

| | | |
|---|---|---|
| 0 465 798 A1 | 1/1992 | (EP) . |
| 0840396A1 | 6/1998 | (EP) . |
| 0840399A2 | 6/1998 | (EP) . |

* cited by examiner

*Primary Examiner*—Lincoln Donovan
*Assistant Examiner*—Chandrika Prasad
(74) *Attorney, Agent, or Firm*—Coats & Bennett, PLLC

(57) ABSTRACT

The cellular telephone of the present invention includes a generally sealed, moisture resistant electrical external connector that resides in the wall of the phone housing and provides a series of electrically conductive pathways which lead from the external surface of the housing, through the housing wall, to designated areas on an internally located printed circuit board. More particularly, these electrically conductive pathways or contacts, that essentially penetrate the cellular telephone housing, are incorporated within the housing wall via an insert molding, press fitting, or similar process such that a generally sealed, moisture resistant barrier is formed between the individual contacts which comprise the connector and the surrounding housing.

14 Claims, 5 Drawing Sheets

MOISTURE RESISTANT ELECTRICAL CONNECTOR FOR A CELLULAR TELEPHONE

FIELD OF THE INVENTION

The present invention relates to electrical connectors for use with hand-held cellular telephone units, and more particularly to a system connector that incorporates electrical contacts directly into the housing of a telephone in a manner such that the connector is sealed with respect to the external environment.

BACKGROUND OF THE INVENTION

System connectors associated with cellular telephones are used to establish and maintain electrical connection between the internal circuitry of the telephone and an external electrical circuit or device. Examples of such external devices and connection requirements are battery charging equipment and base or docking stations typically employed in automobiles to permit hands-free operation of the cellular telephone unit. In the case of charging units, the telephone unit must incorporate external electrical power contacts that provide access to the associated on-board battery pack. The ability to dock with a hands-free base station requires, at a minimum, that the telephone unit incorporate sufficient external electrical contacts to facilitate transfer of the necessary data from the internal circuitry of the telephone unit to the associated base station.

Historically, such system connectors presented openings or pathways for water and debris to freely enter the interior compartment of the telephone. Typically, these penetration pathways are present in the telephone unit because there are several separate components, including a printed circuit board, a structural frame member, and a housing enclosure that must be assembled, none of which are sealed prior to assembly. As such, system connectors are generally comprised of separate pieces that are either soldered directly to the printed circuit board or are pressed onto the printed circuit board with the housing and frame aligning around them.

In addition to the concerns for totally sealing the cellular telephone, it is also desirable to provide a system connector that can be easily and efficiently electrically coupled to the printed circuit board. Typically, system connectors, sometimes herein referred to as external connectors, are often connected to the printed circuit board by hand or reflow soldering. In some instances, the external connector is attached to the front cover of the cellular telephone with an adhesive and then the external connector and the printed circuit board are interconnected with a flex film assembly. There are shortcomings and drawbacks to both of these approaches. With respect to hand soldering, this is expensive because most operations are done manually. Further, yields tend to be low due to operator error and the varying skill levels found among workers. Reflow soldering operations are difficult to manage because of the large size of the external connector. With respect to utilizing a flex film assembly, this approach adversely affects the overall size of the cellular telephone. In the end, the flex film assembly requires more space and that translates into a larger cellular telephone. In addition, it is expensive to assemble flex film because flex film assemblies are not generally automatable. Finally, utilizing an approach where the external connector is permanently attached to the printed circuit board results in additional tolerance concerns between the external connector contact and the housing of the cellular telephone. This adversely affects the tolerance stack up between accessories that attach to the housing of the cellular telephone and their mating system connector contacts. In the end, overall component tolerances must be held tighter, and this, of course, increases cost. As a result, one finds that the overall package design of the cellular telephone suffers. To accommodate these large tolerances, the packaging size of the cellular telephone necessarily increases.

Therefore there remains the need for a waterproof or sealed system connector for cellular telephone units that can be manufactured and implemented easily and inexpensively, which eliminates the risk of moisture penetration and subsequent damage to the internal electrical components that comprise the telephone. In addition, there is a need for a system connector design that forms an integral part of the housing structure of the cellular telephone which is capable of automated assembly, with the system connector being designed to interface with the printed circuit board through pressure contacts rather than soldered contacts.

SUMMARY OF THE INVENTION

The present invention entails a cellular telephone having an external connector that is formed into the housing of the telephone so as to form a tight, water resistant seal between the external connector and the housing structure of the telephone. In one embodiment, the external connector is inserted into the lower edge of the telephone housing structure. In particular the external connector includes a series of contacts that are individually insert molded into the housing structure. In a second embodiment, during the process of molding the housing, a series of apertures are formed in the housing structure of the cellular telephone and thereafter the individual contacts that comprise the external connector are press fitted into the formed apertures in such a fashion that a generally tight and water resistant seal is formed between the individual contacts and the apertures formed within the housing structure.

In both embodiments discussed above, the individual contacts that form the external connector are designed to form a pressure connection with a printed circuit board connector or to contacts that are formed on the printed circuit board. Thus the connection between the external connector and the printed circuit board is a nonpermanent pressure type connection that is created by the selective positioning of the printed circuit board within the housing structure of the cellular telephone.

It is therefore an object of the present invention to provide a cellular telephone with an external connector that is formed or incorporated within the housing structure of the cellular telephone such that a generally tight and water resistant seal is effectively formed between the individual contacts that comprise the external connector and the housing structure of the cellular telephone.

Another object of the present invention is to provide a cellular telephone with an external connector of the character described above wherein the external connector makes contact with the printed circuit board through a nonpermanent pressure connection.

Other objects and advantages of the present invention will become apparent and obvious from a study of the following description and the accompanying drawings, which are merely illustrative of such invention.

DETAILED DESCRIPTION OF THE INVENTION

Figure 1:
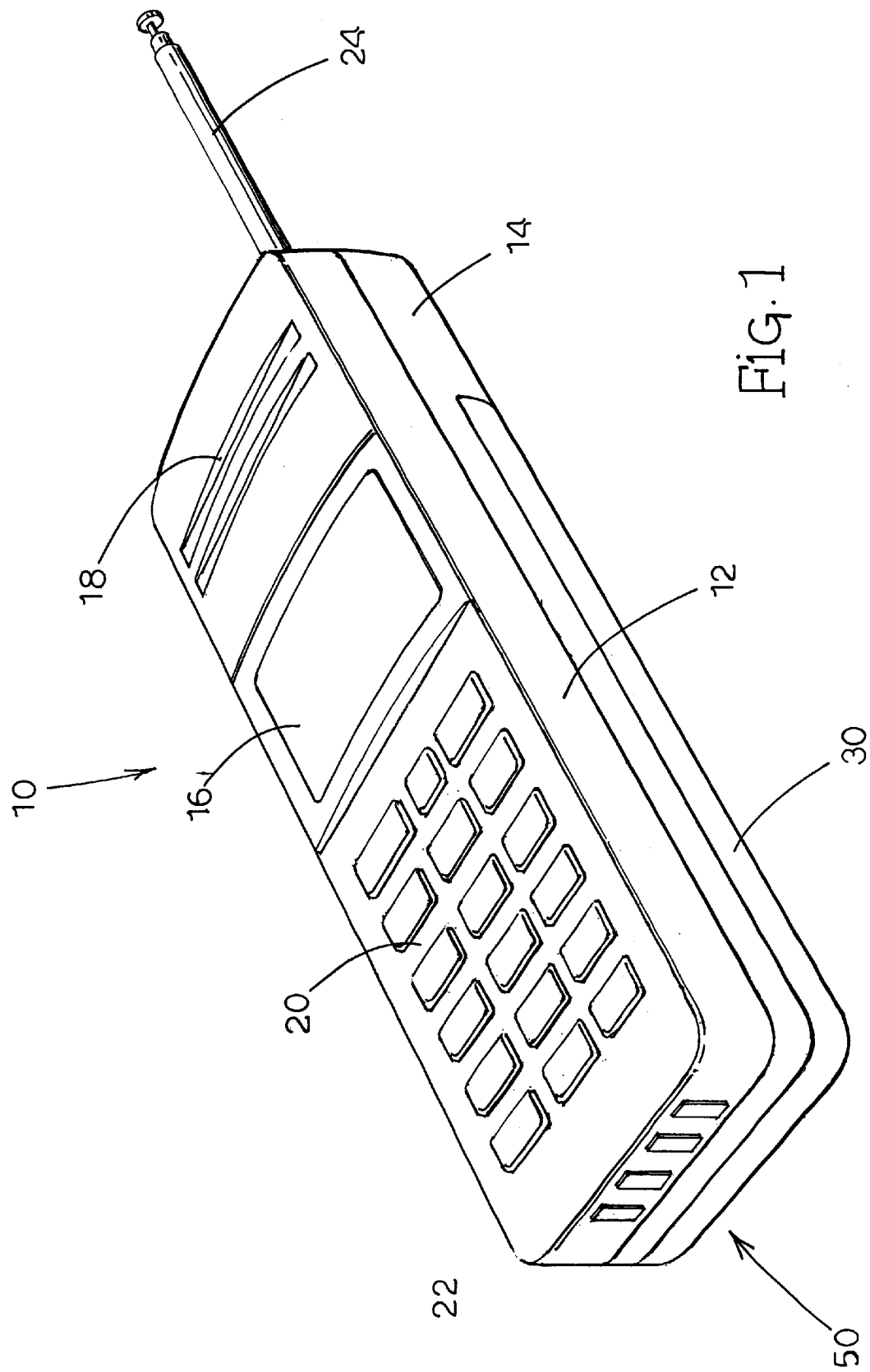
FIG. 1 is a perspective view of the cellular telephone of the present invention.

Shown in FIG. 1 is a cellular telephone, generally indicated by the numeral 10. Cellular telephone 10 includes an enclosure or housing, which is comprised of an upper section 12 and a lower section 14 adapted so as to couple together and effectively form a case or shell around the components contained within. As shown in FIG. 1, the upper section 12 of the housing contains a number of significant functional elements. For example, disposed about the exterior face of the upper housing 12 is a display panel 16, which allows the internal circuitry of the phone to effectively communicate with the user in a visual manner. Adjacent the display panel 16 is an earphone or speaker 18, which facilitates audio communication. Also disposed on the face of the upper housing 12 is a keypad 20, which provides the user with a tactile data entry or input interface. A microphone 22 is located adjacent the keypad 20 and is disposed so as to accept audio input from the user. Immediately adjacent the display panel 16, at one end of the upper housing 12, is an antenna 24, while the other end of the upper housing 12 includes an external electrical connector, which is generally indicated by the numeral 50 A battery pack 30 is provided and adapted to be mounted to the backside of the lower housing section 14.

The above description generally describes the cellular telephone 10 as particularly shown in FIG. 1. Details of the cellular telephone 10 are not dealt with herein in detail because such is not per se material to the present invention, and because basic cellular telephone technology is well known and understood by those skilled in the art. Further, cellular telephones of the general type shown in FIG. 1 and discussed above are commercially available and are manufactured by various manufacturers, including Ericsson, Inc., of Research Triangle Park, N.C., 27709.

Disposed within the cellular telephone 10 is a printed circuit board 26. Printed circuit board 26 is adapted to be electrically coupled to the external connector 50. As will be appreciated from subsequent portions of the disclosure, the connection between the printed circuit board 26 and the external connector 50 will be a nonpermanent pressure connection. Accordingly, in the embodiments shown in FIGS. 2 and 3, the printed circuit board 26 is provided about one edge portion with a series of discreet electrically conductive contact pads 28. In order to appropriately locate the printed circuit board 26 and the contact pads 28 for connection with the external connector 50, the housing structure of the cellular telephone 10 is, in conventional fashion, provided with one or more circuit board locators (not shown) that automatically position the printed circuit board 26 in a proper position within the cellular telephone 10.

Figure 2:
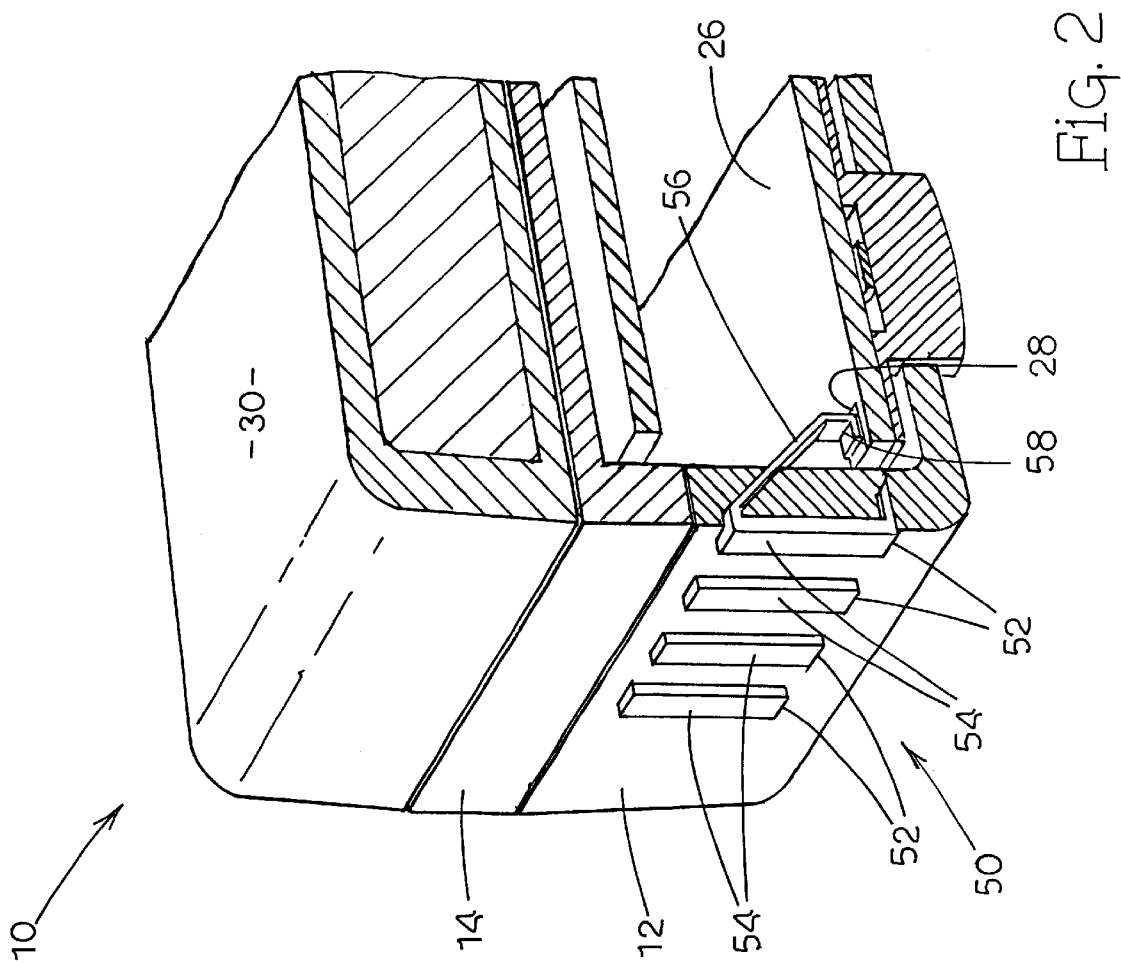
FIG. 2 is a fragmentary perspective view of the cellular telephone, illustrating an insert-molded connector formed in the housing structure of the cellular telephone.

Shown in FIG. 2 is a first embodiment of the external connector 50 of the present invention. In this first embodiment, the connector 50 is generally comprised of a series of electrically conductive contacts 52 which are embedded or formed into the wall of the upper housing 12 through an insert molding process. That is, during the housing fabrication process the individual contacts 52 are temporarily supported within the mold while liquid plastic resin is injected or poured in and generally around them. Once this plastic housing material has solidified or hardened, the individual contacts 52 are permanently set within the wall of the upper housing 12, and furthermore, the interface established between the contacts 52 and the adjacent plastic housing is so tight as to effectively form a seal which is generally waterproof and impermeable to moisture. Consequently, the overall connector 50 exhibits a generally waterproof or water-resistant property or characteristic. That is, as a consequence of the molding process, a sealed relationship is established between the contacts 52 and the adjacent plastic housing 12, such that moisture or other debris from the external environment is not permitted to pass freely into the interior cavity of the phone 10.

With particular regard to the contacts 52 illustrated in FIG. 2, it will be appreciated that these contacts are comprised of a relatively thin strip of an electrically conductive material such as copper or the like, and that this relatively thin conductive strip of material is bent or formed into a generally V-shaped configuration. As such, each contact 52 includes an elongated external contacting face 54, an angled spring arm 56, and an internal contact or contacting tab 58. As a consequence of the insert molding process described above, each contact 52 is oriented within the side wall of the upper housing 12 such that the elongated external contacting face 54 is positioned vertically and generally exposed for connection to a corresponding external electrical contact (not shown). The angled spring arm 56 extends generally inwardly from the upper edge of the external contacting face 54. Formed about the lower edge of the angled spring arm 56 is the L-shaped internal contacting tab 58. The V-shaped bent configuration provides the contact 52 with a generally resilient or spring-like property. More particularly, when the telephone internals are assembled and the printed circuit board 26 is properly positioned adjacent the series of contacts 52, the free portion of each angled spring arm 56 is elastically deformed as the internal contacting tabs 58 are forcibly pressed against the contact pads 28 which are formed on the exposed surface of the printed circuit board 26. The resilient nature of the contacts 52 causes the displaced angled spring arm 56 to exert a reaction force which causes the associated internal contacting tabs 58 to generally remain in contact with the adjacent printed circuit board 26, and more particularly to remain in contact with the electrical contact pads 28 disposed on the board 26, as shown in FIG. 2.

In this manner, the external connector 50 provides a series of electrically conductive pathways from designated areas on the printed circuit board 26 to the external contact faces 54. More particularly, these electrically conductive pathways, which essentially penetrate the protective upper housing 12, are disposed within the housing wall via an insert molding or similar process such that a generally sealed, moisture resistant barrier is formed between the individual contacts 52 and the surrounding housing.

With respect to the V-shaped spring type contacts 52 described and discussed above, it will be appreciated by those skilled in the art that there are any number of specific contact shapes or configurations that may be successfully employed in the cellular telephone 10. In the end, such contacts should lend themselves to insert molding or permanent incorporation into the telephone housing structure, provide externally exposed surfaces for interfacing with external electrical connections, and provide internal contacts which establish and maintain a reliable electrical connection with the internal printed circuit board 26.

In the embodiment shown in FIG. 2, external connector 50 assumes the form of a series of individual contacts with each individual contact being insert molded into the housing structure of the cellular telephone. However, it is contemplated that the individual contacts could first be molded into a carrier plate to form a contact assembly, and thereafter, that the entire contact assembly could be insert molded or press fitted into the housing of the cellular telephone. Either way, the net effect is to provide a generally waterproof seal between the contacts and the housing structure, or between the contact assembly and the housing structure.

It will therefore be appreciated that the external connector 50 can be used as an interface for connecting the cellular telephone 10 to a wide variety of electrical connections. For example, the sealed external connector 50 of the present invention can be employed to make an external power connection with a battery charger or a general data communications connection. Additionally, in order to receive certain external connection devices, the housing of the cellular telephone 10 in the area occupied by the external connector 50 can be provided with conventional attachment means (not shown) for receiving the external connection device and maintaining an electrical connection between the external connection device and the external connector 50 formed within the housing of the cellular telephone.

Figure 3:
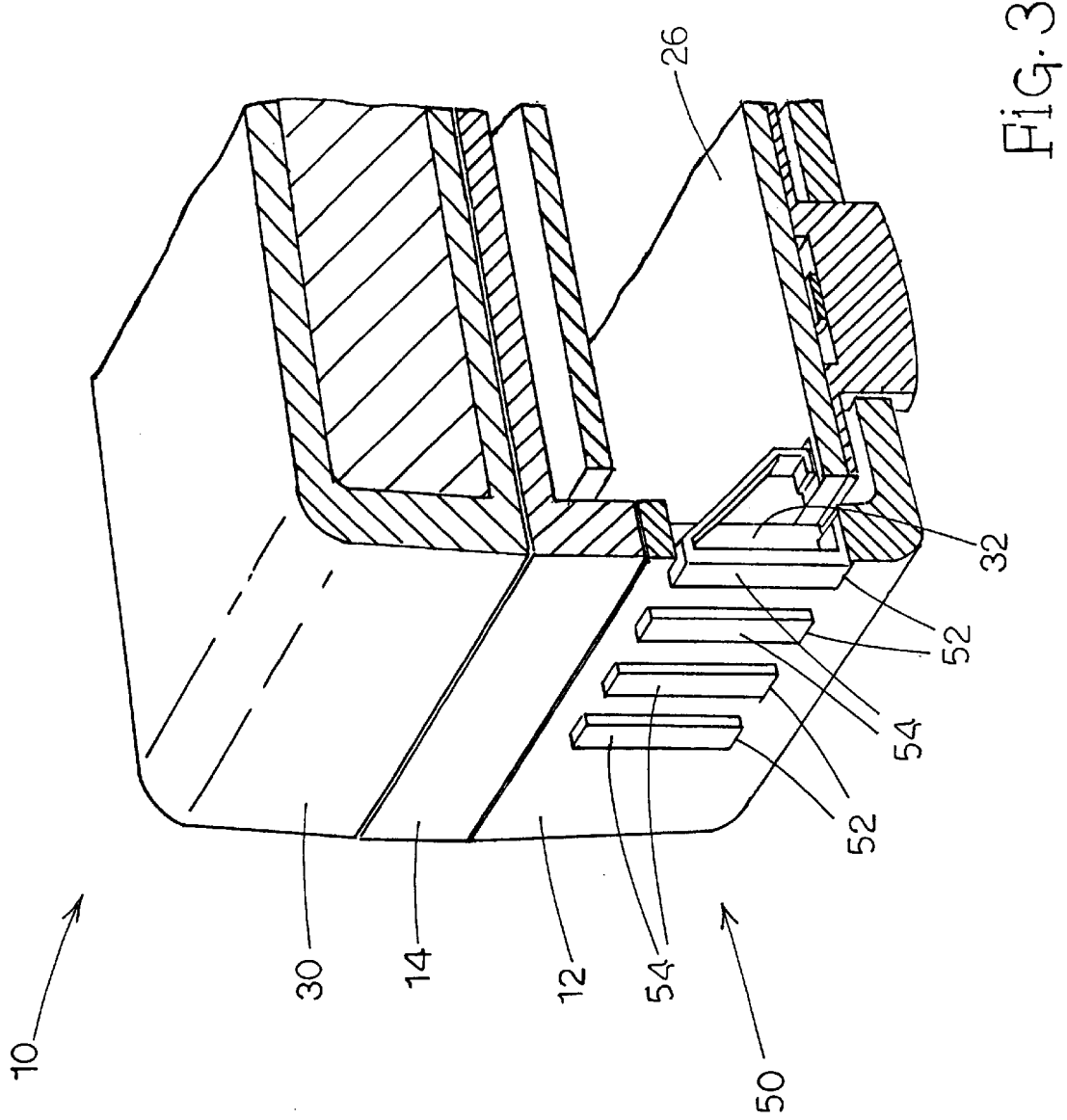
FIG. 3 is a fragmentary perspective view of the cellular telephone illustrating a second embodiment where the external connector is press fitted into a series of molded apertures formed in the housing structure of the cellular telephone.

Shown in FIG. 3 is a second embodiment of the present invention. As in the first embodiment, the external connector 50 is generally comprised of a series of electrically conductive, V-shaped contacts 52. However, in the case of the second embodiment, these contacts are not directly insert molded within the wall of the upper housing 12. Instead, a series of openings or appetures 32 are formed in the wall of the upper housing 12 during the molding process. These openings or appetures 32 are sized so as to precisely accommodate the V-shaped contacts 52 which are inserted during a fabrication step which follows the initial molding of the housing structure The contacts are typically inserted into the housing appetures 32 and secured therein by press fitting.

As shown in FIG. 3, the appetures 32 that are formed in the housing wall during the initial molding process are sized so as to accommodate the contacts 52 in the same basic orientation as described for the first embodiment. That is, each press fitted contact 52 is oriented within the side wall of the upper housing 12 such that the elongated external contacting face 54 is positioned vertically and generally exposed for connection to a corresponding external electrical connector (not shown). As a consequence of the press fit insertion process, the exposed surfaces of the elongated external contact surfaces 54 are wedged into the appetures 32 in such a manner so as to generally secure the contacts 52 therein. That is, the four edges of each external contact surface 54 are generally wedged tightly between the four walls of the appeture 32. As a consequence of this tight interface that is formed between the press fitted contact 52 and walls of the appeture 32, a seal or barrier is effectively established which acts to prevent moisture or other external debris from passing through and into the interior cavity of the telephone 10. As with the first embodiment, the angled spring arms 56 extend inwardly from the upper edge of the external contacting faces 54. Formed on the lower edge of the angled spring arms 56 are the L-shaped internal contacting tabs 58.

Once again, the V-shaped bent configuration provides the contact 52 with a generally resilient or spring-like property. More particularly, when the telephone internals are assembled and the printed circuit board 26 is properly positioned adjacent the series of contacts 52, each angled spring arm 56 is elastically deformed as the internal contacting tabs 58 are forcibly pressed against the contact pads 28 which are formed on the exposed surface of the printed circuit board 26. The resilient nature of the contacts 52 causes the displaced angled spring arms 56 to exert a reaction force which causes the associated internal contacting tabs 58 to generally remain in contact with the adjacent printed circuit board 26, and more particularly to remain in contact with the electrical contact pads 28 disposed on the board 26, as shown in FIG. 3.

Figure 4:
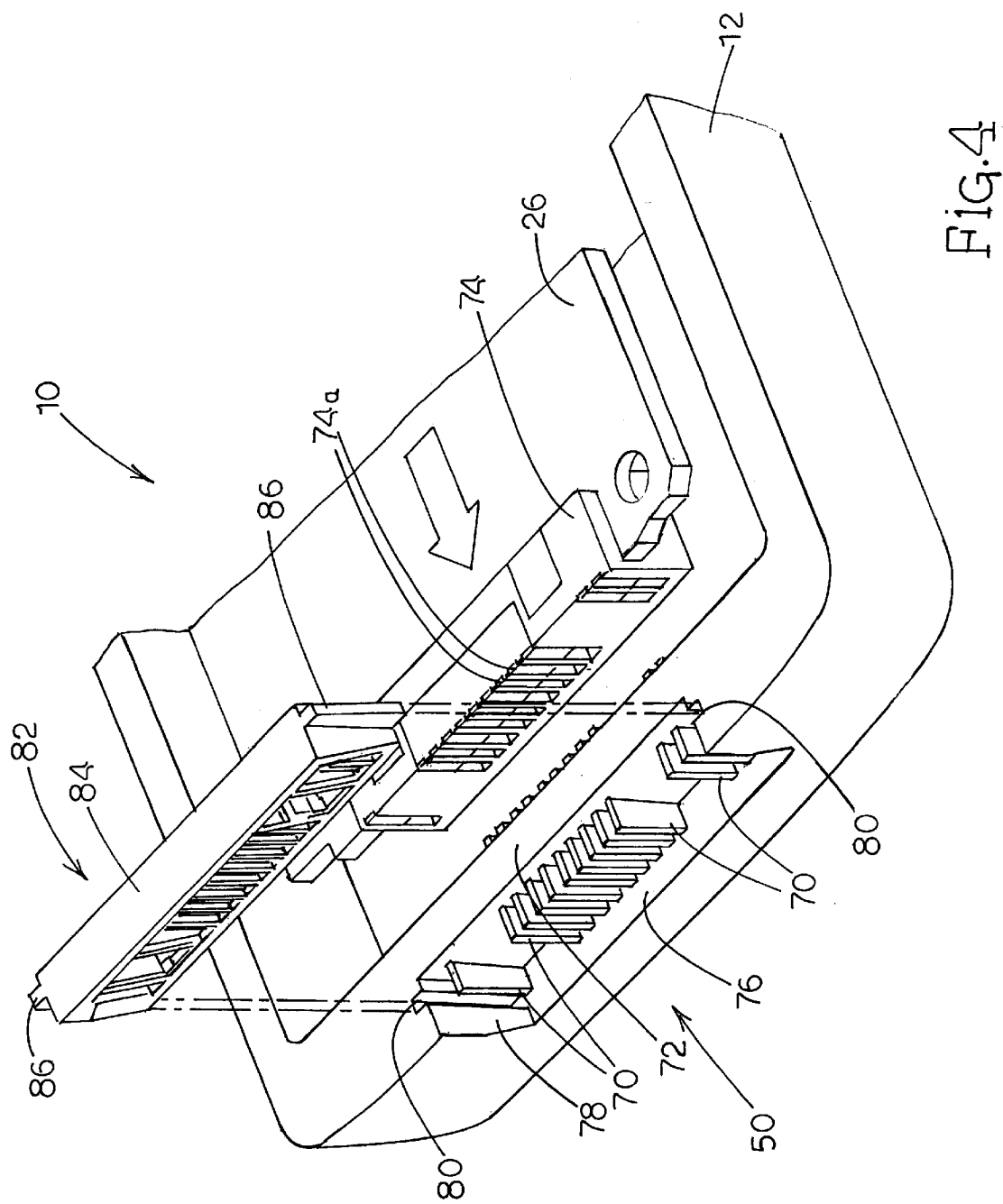
FIG. 4 is a fragmentary exploded view of the cellular telephone of the present invention illustrating a third embodiment for the external connector wherein a grill or cosmetic cover is adapted to be disposed adjacent the outer side of the external connector.
Figure 5:
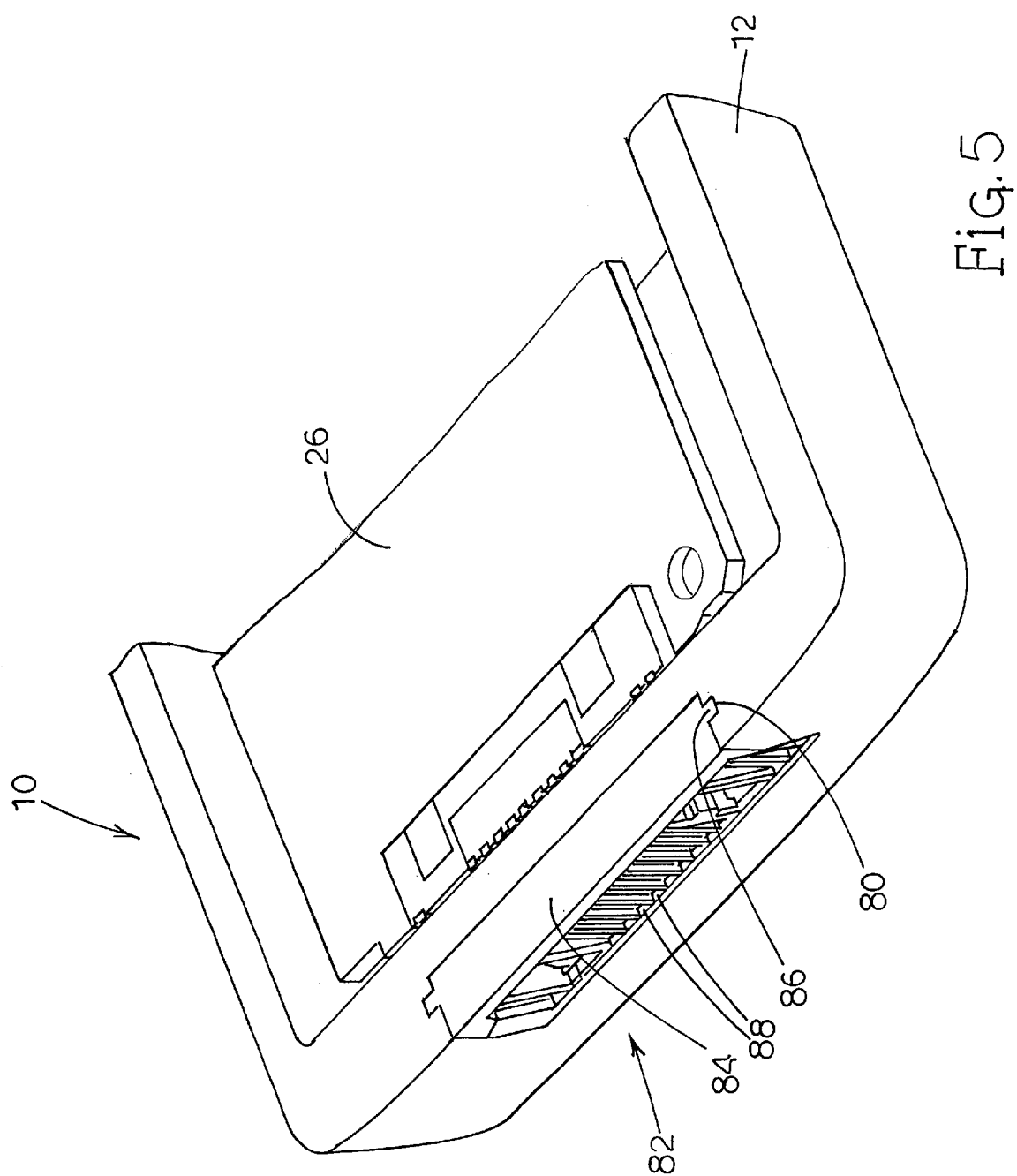
FIG. 5 is a fragmentary perspective view of the third embodiment illustrating the cosmetic cover or grill and the printed circuit board disposed in their normal position within the cellular telephone.

Turning to FIGS. 4 and 5, another embodiment of the present invention is disclosed therein. Here the external connector 50 is in the form of a series of contact slugs 70 that are insert molded or press fitted into a recessed wall 72 that forms a part of the upper housing 12 of the cellular telephone 10. Note that the respective contact slugs 70 include outer terminal ends that project outwardly from the recessed wall 70 and inner terminal ends that project inwardly from the same recessed wall 70. It is appreciated that the outer terminal ends form the contacting surfaces that actually engage and make electrical contact with an external device such as a battery charger or receiving cradle. Likewise the inner terminal ends of the contact slugs 70 are adapted to form a pressure connection with the printed circuit board 26 or in this case a printed circuit board connector 74 that is attached to the end of printed circuit board that is normally disposed adjacent the contact slugs 70.

Formed in the front housing 12 adjacent the recessed wall 72 is a molded seat that includes a bottom ledge 76 and a pair of opposed side edges 78. Each side edge 78 includes an elongated vertical groove 80 formed therein. Mounted in the seat is a grill or cosmetic cover, indicated generally by the numeral 82. Cosmetic cover 82 includes a surrounding frame 84 and a series of grill slats 88 that project generally vertically between the upper and lower members of the surrounding frame 84. Disposed on opposite sides of the frame 84 is a pair of tongues 86 that are adapted to project into and slide through the vertical grooves 80.

It is contemplated that in one embodiment, the backside of the cosmetic cover 82 could be provided with a series of open grooves (not shown) that are particularly spaced for receiving the outer terminal ends of the contact slugs 70 that project outwardly from the recessed wall 72. That is, when the cosmetic cover 82 assumes the installed position shown in FIG. 5, the outer terminal ends of the contact slugs 70 would project into and at least partially through the grooves formed on the backside of the cosmetic cover 82. The outer end portions of the contact slugs 70 would still be accessible through the slats 88 formed in the cosmetic cover 82. This would effectively isolate and control the pitch between respective contacts and further this arrangement would provide structural support and help ensure that the contacts do not deform.

In addition, and alternatively, a gasket material such as silicone or epoxy could be disposed between the cosmetic cover and the molded geometry of the seat area defined for receiving the cosmetic cover. This would provide additional environmental protection for the internal areas within the cellular telephone should the seal between the housing and the contact slugs break as a result of the cellular telephone being dropped.

In the case of the embodiment shown in FIGS. 4 and 5, it is appreciated that the connection between the contact slugs 70 and the contacts 74a that form a part of the printed circuit board connector 74 is a nonpermanent pressure contact. More particularly, it will be appreciated that once the printed circuit board 26 is appropriately located internally within the housing structure of the cellular telephone 10, the contacts 74a carried on the printed circuit board connector 74 will align with the inner end portions of the contact slugs 70. Because of the arrangement of the contact slugs 70 and the position occupied by the printed circuit board connector 74, and due to the spring nature of the contacts 74a, a continuous pressure type connection is maintained between the contact slugs 70 and the respective contacts 74a.

In the embodiment illustrated herein, the external connector 50 is connected to the printed circuit board in various ways. One approach not expressly shown, entails the use of a conductive elastomer. Basically the conductive elastomer would be interposed but electrically connected between the external connector 50 and appropriate contacts on the printed circuit board. Because of the elastic nature of the conductive elastomer it follows that the conductive elastomer would compensate for tolerances and yet maintain a continuous electrical connection between the external connector 50 and the printed circuit board.

From the foregoing specification and discussion, it is seen that the cellular telephone of the present invention includes an external connector 50 that is insert molded or press fitted into the housing of the cellular telephone so as to create or form a generally water resistant seal between the external connector and the housing structure. This protects the internal environment within the housing of the telephone and prevents moisture, dust, and other debris from passing between the external connector and the housing structure into the internal areas of the cellular telephone.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A cellular telephone having an insert molded external connector formed in the housing of the telephone, comprising:
   a) a housing structure surrounding portions of the cellular telephone and encasing internal components within the cellular telephone;
   b) a printed circuit board disposed within the housing structure of the cellular telephone;
   c) an external connector insert molded in the housing structure of the cellular telephone such that a sealed relationship is formed between the housing structure of the cellular telephone and the external connector; and
   d) the external connector having one or more externally exposed contact surfaces, and one or more internal contact surfaces that operatively connect the external connector with the printed circuit board of the cellular telephone.

2. The cellular telephone of claim 1 wherein in the internal contact surfaces project inwardly from the housing and engage contacts associated with the printed circuit board through a pressure connection.

3. The cellular telephone of claim 1 wherein the external connector includes a series of individual contacts and wherein the individual contacts are each independently insert molded into the housing structure such that a sealed relationship is formed between each individual contact and the surrounding housing structure of the cellular telephone.

4. The cellular telephone of claim 3 wherein each insert molded contact includes an external contact surface, and an internal contact surface that projects inwardly from the housing structure for engagement with at least one contact point associated with the printed circuit board.

5. The cellular telephone of claim 4 wherein the internal contact surfaces are spring biased for engagement with the contact points associated with the printed circuit board.

6. The cellular telephone of claim 3 wherein each contact includes a contact surface that is disposed generally within a plane of the housing structure, and a spring finger extending inwardly from the contact surface of the cellular telephone.

7. The cellular telephone of claim 6 wherein the spring finger includes a terminal contact pad for engaging a contact associated with the printed circuit board.

8. The cellular telephone of claim 1 including a grill secured within the housing and disposed adjacent an outer side of the external connector.

9. The cellular telephone of claim 1 wherein the seal formed between the insert molded external connector and the housing structure is waterproof.

10. A cellular telephone having an integral and sealed external connector incorporated within the housing thereof, comprising:
   a) a housing structure surrounding portions of the cellular telephone and encasing internal components within the cellular telephone;
   b) a printed circuit board disposed within the housing structure of the cellular telephone;
   c) a series of molded apertures formed in the housing structure of the cellular telephone;
   d) an external connector having a series of contacts press fitted into the respective molded apertures to form a tight sealed relationship between the housing structure of the cellular telephone and the contacts; and
   e) each contact having an externally exposed surface, and an internal surface that operatively connects to the printed circuit board within the cellular telephone.

11. The cellular telephone of claim 10 wherein each individual contact includes a spring finger that projects inwardly from the external surface towards the printed circuit board.

12. The cellular telephone of claim 11 wherein each respective spring finger includes a terminal end portion that includes the internal surface that operatively connects the respective contacts to the printed circuit board.

13. The cellular telephone of claim 11 wherein a nonpermanent pressure connection is formed between the respective individual contacts and the printed circuit board.

14. The cellular telephone of claim 1 wherein the external connector includes an elongated external contacting face mounted in the cellular telephone housing structure such that the contacting face is disposed generally flush with the housing of the cellular telephone, an angle spring arm extending inwardly from the contacting face towards the printed circuit board and an internal contacting tab secured to the angle spring arm and connecting to the printed circuit board through a pressure contact.

* * * * *